United States Patent
Mehta et al.

(10) Patent No.: US 9,460,017 B1
(45) Date of Patent: Oct. 4, 2016

(54) METHODS AND SYSTEMS FOR EFFICIENT CACHE MIRRORING

(71) Applicant: QLOGIC, Corporation, Aliso Viejo, CA (US)

(72) Inventors: Viral Mehta, Gujarat (IN); Paul Moreau, Anaheim, CA (US); Lolo Ramirez, Walnut, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 59 days.

(21) Appl. No.: 14/498,580

(22) Filed: Sep. 26, 2014

(51) Int. Cl.
*G06F 12/00* (2006.01)
*G06F 12/08* (2016.01)
*G06F 3/06* (2006.01)

(52) U.S. Cl.
CPC ........... *G06F 12/0866* (2013.01); *G06F 3/065* (2013.01); *G06F 3/067* (2013.01); *G06F 3/0611* (2013.01); *G06F 2212/281* (2013.01); *G06F 2212/314* (2013.01)

(58) Field of Classification Search
None
See application file for complete search history.

(56) References Cited

U.S. PATENT DOCUMENTS

| | | |
|---|---|---|
| 5,689,678 A | 11/1997 | Stallmo et al. |
| 6,219,676 B1 | 4/2001 | Reiner |
| 6,467,022 B1 | 10/2002 | Buckland et al. |
| 6,484,229 B1 | 11/2002 | Ichikawa et al. |
| 6,502,205 B1 | 12/2002 | Yanai et al. |
| 6,745,324 B1 | 6/2004 | Skazinski et al. |
| 6,799,283 B1 | 9/2004 | Tamai et al. |
| 6,922,754 B2 | 7/2005 | Liu et al. |
| 7,013,336 B1 | 3/2006 | King |
| 7,249,221 B2 | 7/2007 | Shimada |
| 7,272,674 B1 | 9/2007 | Nandi et al. |
| 7,356,573 B2 | 4/2008 | Sharma et al. |
| 7,506,124 B2 | 3/2009 | Sharma et al. |
| 7,617,289 B2 | 11/2009 | Srinivasan et al. |
| 7,631,155 B1 | 12/2009 | Bono et al. |
| 7,685,269 B1 | 3/2010 | Thrasher et al. |
| 7,865,663 B1 | 1/2011 | Nelson et al. |
| 7,873,619 B1 | 1/2011 | Faibish et al. |
| 8,099,499 B2 | 1/2012 | Oeda |
| 8,510,265 B1 | 8/2013 | Boone et al. |
| 8,555,022 B1 | 10/2013 | Edwards et al. |
| 8,589,550 B1 | 11/2013 | Faibish et al. |

(Continued)

OTHER PUBLICATIONS

International Search Report on corresponding PCT application (PCT/US2013/042918) from International Searching Authority (USPTO) dated Nov. 27, 2013.

(Continued)

*Primary Examiner* — Brian Peugh
(74) *Attorney, Agent, or Firm* — Klein, O'Neill & Singh, LLP

(57) ABSTRACT

Systems, methods, and storage mediums storing executable instructions are disclosed for providing efficient cache mirroring, particularly in a distributed storage environment. In particular, in an aspect, a machine-implemented method, comprises: receiving an I/O request from an application; splitting the I/O request into cache LBAs and non-cache LBAs; storing the cache LBAs in a cache LUN; preparing one or more mirror write descriptors based on the cache LBAs, wherein each mirror write descriptor includes a data location and a data length; and sending the mirroring data structure and the cache LBAs to a mirroring device to store a back-up of the cache LUN. In an aspect, sending the mirroring data structure and the cache LBAs is accomplished in a single I/O request to the mirroring device.

21 Claims, 7 Drawing Sheets

(56) References Cited

U.S. PATENT DOCUMENTS

| | | | |
|---|---|---|---|
| 8,626,967 | B1 | 1/2014 | Naik et al. |
| 8,639,872 | B1* | 1/2014 | Boyle .............. G06F 12/0871 |
| | | | 711/103 |
| 8,805,951 | B1 | 8/2014 | Faibish et al. |
| 8,863,145 | B2 | 10/2014 | Watanabe et al. |
| 9,009,444 | B1 | 4/2015 | Derbeko et al. |
| 9,172,586 | B1 | 10/2015 | Shah et al. |
| 9,232,005 | B1 | 1/2016 | Shah et al. |
| 2003/0135782 | A1 | 7/2003 | Matsunami et al. |
| 2003/0140209 | A1 | 7/2003 | Testardi |
| 2003/0172149 | A1 | 9/2003 | Edsall et al. |
| 2005/0027798 | A1 | 2/2005 | Chiou et al. |
| 2005/0210314 | A1 | 9/2005 | Iguchi |
| 2006/0031653 | A1 | 2/2006 | Todd et al. |
| 2006/0075190 | A1 | 4/2006 | Higaki et al. |
| 2006/0095709 | A1 | 5/2006 | Achiwa |
| 2006/0218362 | A1 | 9/2006 | McManis |
| 2006/0282618 | A1 | 12/2006 | Thompson et al. |
| 2007/0016681 | A1 | 1/2007 | Suzuki et al. |
| 2007/0028073 | A1 | 2/2007 | Takayama et al. |
| 2008/0071984 | A1 | 3/2008 | Araki et al. |
| 2008/0104259 | A1 | 5/2008 | LeFevre et al. |
| 2008/0114961 | A1 | 5/2008 | Ramaswamy et al. |
| 2008/0270700 | A1 | 10/2008 | Rao et al. |
| 2008/0270727 | A1 | 10/2008 | Jacobson et al. |
| 2009/0055507 | A1 | 2/2009 | Oeda |
| 2009/0064161 | A1 | 3/2009 | Hosouchi et al. |
| 2009/0187713 | A1 | 7/2009 | Zedlewski et al. |
| 2009/0210620 | A1 | 8/2009 | Jibbe et al. |
| 2009/0248975 | A1 | 10/2009 | Daud et al. |
| 2009/0265507 | A1 | 10/2009 | Jibbe et al. |
| 2010/0281230 | A1 | 11/2010 | Rabii et al. |
| 2011/0087833 | A1 | 4/2011 | Jones |
| 2011/0138136 | A1 | 6/2011 | Shitomi et al. |
| 2011/0161557 | A1* | 6/2011 | Haines .............. G06F 12/0893 |
| | | | 711/103 |
| 2011/0191534 | A1 | 8/2011 | Ash et al. |
| 2011/0197046 | A1 | 8/2011 | Chiu et al. |
| 2011/0238672 | A1 | 9/2011 | Agarwala et al. |
| 2011/0276746 | A1 | 11/2011 | Pruthi et al. |
| 2011/0289279 | A1 | 11/2011 | Sonnier et al. |
| 2012/0005668 | A1 | 1/2012 | Serizawa et al. |
| 2012/0089786 | A1 | 4/2012 | Pruthi |
| 2012/0102137 | A1 | 4/2012 | Pruthi et al. |
| 2012/0137059 | A1 | 5/2012 | Yang et al. |
| 2012/0159053 | A1 | 6/2012 | Kano et al. |
| 2012/0221729 | A1 | 8/2012 | Hara et al. |
| 2012/0254504 | A1 | 10/2012 | Syu et al. |
| 2012/0254509 | A1 | 10/2012 | Cleveland et al. |
| 2012/0331222 | A1 | 12/2012 | Jibbe et al. |
| 2013/0042048 | A1 | 2/2013 | Kutergin et al. |
| 2013/0080715 | A1 | 3/2013 | Mori et al. |
| 2013/0111474 | A1 | 5/2013 | Agarwal et al. |
| 2013/0132673 | A1 | 5/2013 | Saito et al. |
| 2013/0198457 | A1 | 8/2013 | Kobayashi et al. |
| 2013/0198459 | A1 | 8/2013 | Joshi |
| 2013/0238851 | A1 | 9/2013 | Chang et al. |
| 2013/0282982 | A1 | 10/2013 | Hayashi |
| 2013/0290571 | A1 | 10/2013 | Rizzo et al. |
| 2013/0332612 | A1 | 12/2013 | Cai et al. |
| 2013/0339600 | A1 | 12/2013 | Shah |
| 2014/0013027 | A1 | 1/2014 | Venkata et al. |
| 2014/0122778 | A1 | 5/2014 | O'Brien |
| 2014/0129521 | A1 | 5/2014 | Marsden |
| 2014/0244935 | A1 | 8/2014 | Ezra et al. |
| 2014/0258533 | A1 | 9/2014 | Antony |
| 2015/0058547 | A1 | 2/2015 | Thatcher et al. |
| 2015/0134920 | A1 | 5/2015 | Anderson et al. |
| 2015/0143023 | A1 | 5/2015 | Rostoker et al. |

OTHER PUBLICATIONS

Written Opinion on corresponding PCT application (PCT/US2013/042918) from International Searching Authority (USPTO) dated Nov. 27, 2013.

Office Action from USPTO dated Dec. 24, 2014 for U.S. Appl. No. 13/790,395.

International Preliminary Report on Patentability on corresponding PCT application (PCT/US2013/042918) from International Bureau (WIPO) dated Dec. 16, 2014.

Office Action from USPTO dated Feb. 20, 2015 for U.S. Appl. No. 13/790,894.

Office Action from USPTO dated Feb. 24, 2015 for U.S. Appl. No. 13/902,427.

Office Action from USPTO dated Mar. 3, 2015 for U.S. Appl. No. 13/790,800.

Office Action from USPTO dated Mar. 11, 2015 for U.S. Appl. No. 13/790,846.

Office Action from USPTO dated Mar. 27, 2015 for U.S. Appl. No. 13/790,471.

Office Action from USPTO dated May 7, 2015 for U.S. Appl. No. 13/790,499.

"QLOGIC 10000 Series QLogic FabricCache Adapter Data Sheet", (Nov. 2013).

Notice of Allowance from USPTO dated Aug. 14, 2015 for U.S. Appl. No. 13/790,846.

Final Office Action from USPTO dated Aug. 18, 2015 for U.S. Appl. No. 13/790,395.

"VMWare Storage Best Practices", *VMWare*, (Apr. 2011), https://www.vmware.com/files/pdf/support/landing_pages/Virtual-Support-Day-Storage-Best-Practices-June-2012.pdf.

Notice of Allowance from USPTO dated Aug. 26, 2015 for U.S. Appl. No. 13/902,427.

Notice of Allowance from USPTO dated Sep. 23, 2015 for U.S. Appl. No. 14/088,082.

Final Office Action from USPTO dated Sep. 24, 2015 for U.S. Appl. No. 13/790,800.

Final Office Action from USPTO dated Oct. 8, 2015 for U.S. Appl. No. 13/790,471.

Final Office Action from USPTO dated Sep. 15, 2015 for U.S. Appl. No. 13/790,894.

Office Action from USPTO dated Oct. 19, 2015 for U.S. Appl. No. 14/165,100.

Final Office Action from USPTO dated Oct. 23, 2015 for U.S. Appl. No. 13/790,499.

Office Action from USPTO dated Dec. 4, 2015 for U.S. Appl. No. 14/193,691.

Notice of Allowance from USPTO dated Nov. 25, 2015 for U.S. Appl. No. 13/790,846.

Office Action from USPTO dated Dec. 21, 2015 for U.S. Appl. No. 14/302,706.

Notice of Allowance from USPTO dated Jan. 15, 2016 for U.S. Appl. No. 13/790,395.

Extended European Search Report from EPO dated Jan. 28, 2016 for EP Application No. 13803862.5.

Notice of Allowance from USPTO dated Jan. 29, 2016 for U.S. Appl. No. 14/470,309.

Office Action from USPTO dated Feb. 26, 2016 for U.S. Appl. No. 13/790,499.

Notice of Allowance from USPTO dated Mar. 1, 2016 for U.S. Appl. No. 13/790,471.

Notice of Allowance from USPTO dated Mar. 1, 2016 for U.S. Appl. No. 14/470,337.

Office Action from USPTO dated Mar. 2, 2016 for U.S. Appl. No. 14/593,898.

Office Action from USPTO dated Mar. 9, 2016 for U.S. Appl. No. 14/312,130.

Notice of Allowance from USPTO dated Mar. 30, 2016 for U.S. Appl. No. 13/790,471.

Notice of Allowance from USPTO dated Apr. 11, 2016 for U.S. Appl. No. 13/790,395.

Final Office Action from USPTO dated Apr. 21, 2016 for U.S. Appl. No. 14/165,100.

Office Action from USPTO dated May 6, 2016 for U.S. Appl. No. 14/339,086.

(56) References Cited

OTHER PUBLICATIONS

Notice of Allowance from USPTO dated May 27, 2016 for U.S. Appl. No. 14/302,706.
Office Action from USPTO dated Jun. 6, 2016 for U.S. Appl. No. 13/790,894.
Office Action from USPTO dated Jun. 6, 2016 for U.S. Appl. No. 13/790,800.
Final Office Action from USPTO dated Jun. 13, 2016 for U.S. Appl. No. 14/193,691.
Notice of Allowance from USPTO dated Jul. 5, 2016 for U.S. Appl. No. 14/302,706.
Notice of Allowance from USPTO dated Jul. 21, 2016 for U.S. Appl. No. 14/312,130.
Notice of Allowance from USPTO dated Jul. 28, 2016 for U.S. Appl. No. 14/165,100.

* cited by examiner

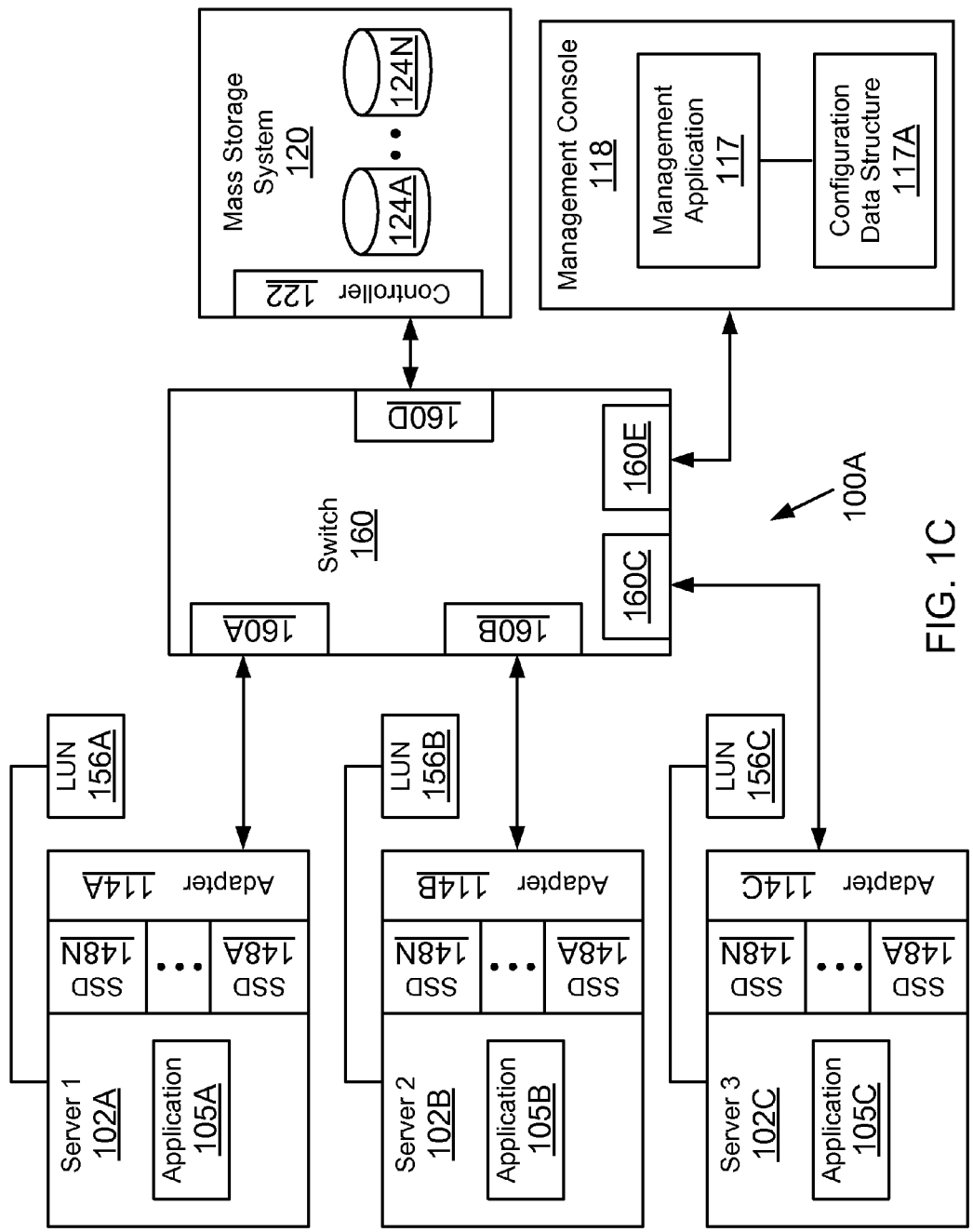

METHODS AND SYSTEMS FOR EFFICIENT CACHE MIRRORING

TECHNICAL FIELD

The present disclosure relates to storage systems and, more particularly, to efficient cache mirroring in storage systems.

BACKGROUND

A computer network, often simply referred to as a network, is a group of interconnected computers and devices that facilitates communication among users and allows users to share resources. Adapters, switches, and other devices are typically used during network communication for reading and writing data at mass storage devices.

Computing devices (or systems) use mass storage devices to store data. Data centers are commonly used to store large amounts of data for computing devices. Different storage options are available for computing devices to store data and retrieve data, for example, direct-attached storage (DAS), network attached storage (NAS), and storage area networks (SANs).

A DAS system typically includes a plurality of storage drives/devices that are directly attached to a computing device (for example, a server) and are accessible via a host bus adapter (HBA). Common protocols used for DAS storage devices are SCSI (Small Computer Systems Interface), ATA (AT attachment), SATA (Serial ATA), SAS (Serial Attached SCSI), and others.

NAS is file-level storage that provides access to a plurality of computing devices. NAS typically uses network file sharing protocols, for example, NFS (Networked File System), CIFS (Common Internet File System) and others for storing and managing data at storage devices.

A SAN is a dedicated network that provides access to consolidated, block level data storage. SANs are primarily used to make storage devices, such as disk arrays, tape libraries, and others, accessible to servers so that the devices appear like locally attached devices to an operating system of a computing device. A SAN typically has its own network of storage devices that are generally not accessible through a local area network. SANs often use a Fibre Channel fabric topology, an infrastructure specially designed to handle storage communications. SANs may also use iSCSI (that maps SCSI over TCP/IP (Transmission Control Protocol/Internet Protocol), Fibre Channel over Ethernet (FCoE), FCP (Fibre Channel over SCSI), Hyper SCSI (i.e. SCSI over Ethernet), and other protocols for storing data at storage devices.

Continuous efforts are being made to provide data reliability and resource efficiency by providing intelligent storage adapters that can cache SAN data and mirror it to provide data security. In doing so, it is important to provide efficient processing of the data caching and mirroring so as not to waste valuable system resources.

BRIEF DESCRIPTION OF THE DRAWINGS

The present aspects relating to the management of network elements now will be discussed in detail with an emphasis on various advantageous features. These novel and non-obvious aspects are depicted in the accompanying drawings, which are for illustrative purposes only. These drawings include the following figures, in which like numerals indicate like parts:

FIG. 1C shows an example of functional block diagram of a configuration for using the ISAs, according to one aspect;

DETAILED DESCRIPTION

Figure 1A:
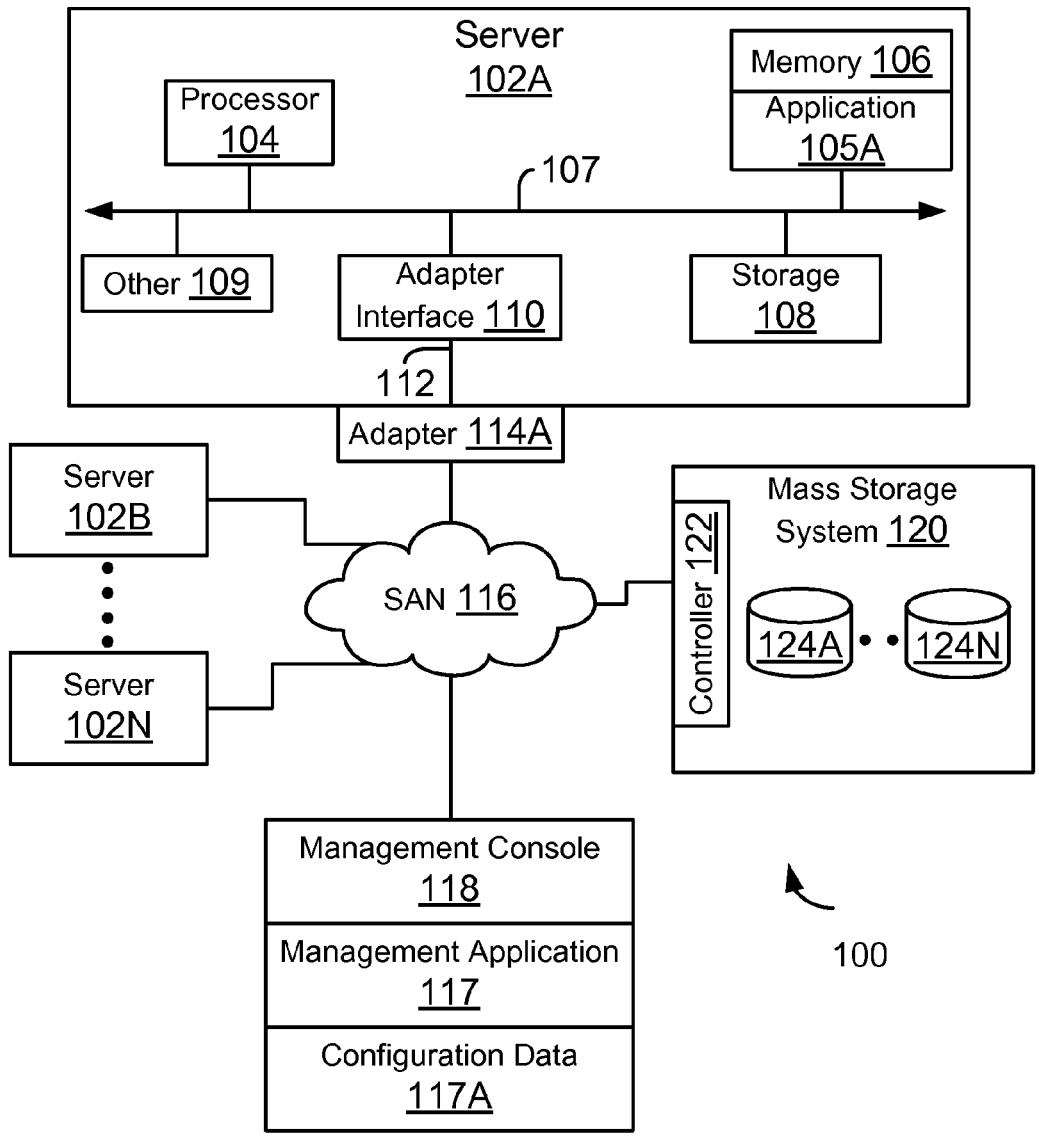
FIG. 1A is a functional block diagram of a system, according to one aspect.

The following detailed description describes the present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), manual processing, or a combination of these implementations. The terms "logic," "module," "component," "system," and "functionality," as used herein, generally represent software, firmware, hardware, or a combination of these elements. For instance, in the case of a software implementation, the terms "logic," "module," "component," "layer," "system," and "functionality" represent executable instructions that perform specified tasks when executed on a hardware-based processing device or devices (e.g., CPU or CPUs). The program code can be stored in one or more non-transitory, computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations. The term "machine-readable media" and the like refers to any kind of medium for retaining information in any form, including various kinds of storage devices (magnetic, optical, static, etc.).

The aspects disclosed herein may be implemented as a computer process (method), a computing system, or as an article of manufacture, such as a computer program product or computer-readable media. The computer program product may be non-transitory, computer storage media, readable by a computer device, and encoding a computer program of instructions for executing a computer process. The computer program product may also be readable by a computing system, and encoding a computer program of instructions for executing a computer process.

In one aspect, an intelligent storage adapter (ISA), for example, a network device is provided. The ISA includes a storage protocol controller having a port for interfacing with a storage area network (SAN)-based storage device and another adapter operating within a cluster. The ISA also includes a processor executing instructions for managing a local storage device that is configured to operate as a caching device for a computing device. The ISA operates as a host bus adapter and a storage controller for managing storage space at the local storage device and the SAN-based storage device. Moreover, a second or more ISA(s) can be configured to operate a mirroring cache to help provide data security.

Utilizing additional resources to provide data redundancy can be of great help. However, if the data redundancy is not provided in an efficient manner, the system resources as a whole may get more bogged down than the redundancy is worth or other system problems may arise. In one aspect, as described below in detail, a primary ISA that provides caching organizes data to reduce processing by another ISA that operates as a mirroring node.

System 100:

FIG. 1A is a block diagram of a system 100 configured for use with the various aspects of the present disclosure. System 100 may include a plurality of computing systems 102A-102N (may also be referred to as server(s) 102 or host system(s) 102), each coupled to an ISA 114A that interfaces with other devices and ISAs, as described below in more detail.

The computing system 102A may include one or more processors 104, also known as central processing units (CPUs). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

Processor 104 executes machine-implemented instructions (or process steps/blocks) out of a memory 106 and interfaces with an interconnect 107 that may be referred to as a computer bus 107. The computer bus 107 may be, for example, a system bus, a Peripheral Component Interconnect (PCI) bus, a PCI-Express (PCIe) bus, a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other type of bus.

The host system 102A may further include a storage device 108, which may include, for example, a hard disk (HDD), a CD-ROM, a non-volatile memory device (flash or memory stick), a hybrid drive (sometimes referred to as SSHD), or any other storage device for storing structured or unstructured data. Storage 108 may store operating system program files (or data containers), application program files, for example, e-mail applications, database applications, management applications, and other application files. Some of these files are stored in storage 108 using an installation program. For example, the processor 104 may execute computer-executable process steps of an installation program so that the processor 104 can properly execute the application program.

In one aspect, storage device 108 may be a solid state storage device (which may also be referred to herein as SSD 108). SSDs are becoming popular for servers that may need to store large amounts of data while being relatively quickly accessible. ISA 114A, which is described below in more detail, may be used to manage and/or access the storage device 108, according to one aspect.

Memory 106 also interfaces with the computer bus 107 to provide the processor 104 with access to memory storage. Memory 106 may include random access main memory (RAM). When executing stored computer-executable process steps from storage 108, the processor 104 may store and execute the process steps out of memory 106. Read only memory (ROM, not shown) may also be used to store invariant instruction sequences, such as startup instruction sequences or basic input/output system (BIOS) sequences for operation of a keyboard (not shown).

In one aspect, processor 104 may execute an application 105A for performing certain functions. For example, application 105A may be a database application, a virtual machine executed in a virtual environment (provided by VMware Corporation, Microsoft Corporation or any other entity), electronic e-mail application (for example, Microsoft Exchange), or any other application type. Application 105A may issue read and write requests that are processed by ISA 114A, as described below in more detail. Application 105A may also be referred to as a "client."

The host system 102A also includes other devices and interfaces 109, which may include a display device interface, a keyboard interface, a pointing device interface, and others. The details of these components are not germane to the inventive aspects disclosed herein.

ISA 114A may be configured to handle both network and storage traffic while interfacing with other elements. In one aspect, as described below in detail, ISA 114A may be configured to provide the functionality of a host bus adapter (HBA) by providing connectivity to SAN (storage area network)-based storage arrays as well as present logical storage from a local storage device connected to the ISA. Various network and storage protocols may be used to handle network and storage traffic, for example, Ethernet, Fibre Channel, Fibre Channel over Ethernet (FCoE), Internet over Small Computer System Interface (iSCSI), and others. Some of the common protocols are described below.

Ethernet is a common network protocol used for network communication. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support data transfer rates that are greater than 1 gigabit (Gb). The various aspects described herein may use Ethernet (which includes 100 Base-T and/or Gigabit Ethernet) as the network protocol. However, the adaptive aspects disclosed herein are not limited to any particular protocol, as long as the functional goals are met by an existing or new network protocol.

Fibre Channel (may also be referred to as "FC") is a common storage protocol used in SANs. Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches host systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

A new and upcoming standard, called Fibre Channel over Ethernet (FCOE) has been developed to handle both Ethernet and Fibre Channel traffic in a storage area network (SAN). This functionality would allow Fibre Channel to leverage high speed, for example, 10 Gigabit Ethernet networks while preserving the Fibre Channel protocol. In one aspect, ISA 114A can be configured to operate as a FCOE adapter. Those of ordinary skill in the art will appreciate, however, that the present aspects are not limited to any particular protocol.

iSCSI is an IP-based storage networking standard for linking data storage facilities. By carrying SCSI commands over IP networks, iSCSI is used to facilitate data transfers over intranets and to manage storage over long distances. iSCSI can be used to transmit data over local area networks (LANs), wide area networks (WANs), or the Internet and can enable location-independent data storage and retrieval. The protocol allows clients to send SCSI commands (referred to as command or (control) data blocks (CDBs) to SCSI storage devices (may be referred to as targets) on remote servers. iSCSI is a SAN-based protocol, allowing organizations to consolidate storage into data center storage arrays while providing hosts (such as database and web servers) with the illusion of locally attached disks. Unlike traditional Fibre Channel, which uses special-purpose cabling, iSCSI can be run over long distances using existing network infrastructure. In one aspect, ISA 114A may operate as an initiator as well as a target for responding to input/output (referred to as I/O or "IO") requests for reading and writing information at storage devices.

Storage space at a storage device (local or SAN-based) is typically presented to application 105A as a logical entity referred to as a logical unit number (LUN). Each LUN is uniquely identified by an identifier (LUN ID) and is associated with physical storage space. A LUN has a size associated with it that may indicate the amount of storage space that is made available to a computing system and a drive letter that may be used to access the LUN.

A LUN is typically divided into logical block addresses (LBAs) that are used by application 105A to read and write data to storage locations. The LBAs are mapped with actual physical storage to read and write data. A LUN used by an application may be referred to as a data LUN. A LUN that is accessible via a SAN connection may be referred to as a SAN LUN. A LUN at a local storage device managed by ISA 114A may be referred to as a "cache" LUN. A cache LUN may be used to cache data stored at a SAN LUN or another data LUN. The cache LUN is managed by ISA 114A and may not be visible to application 105A.

Referring back to FIG. 1A, computing system 102 uses an adapter interface 110 to communicate with ISA 114A via a link 112. In one aspect, link 112 may be a PCI-Express link or any other interconnect type. The adaptive aspects disclosed herein are not limited to any particular link type.

ISA 114A may communicate and interface with a mass storage system 120 via a SAN 116 that may include one or more switches (may be referred to as fabric switches). The mass storage system 120 may include a plurality of storage devices 124A-124N. Storage space at storage devices 124A-124N may be presented as SAN LUNs to application 105A via SAN 116. Controller 122 of mass storage system 120 may be used to manage storage devices 124A-124N. In one aspect, controller 122 may include a processor, an ISA 114 and other similar components.

System 100 may also include a management console 118, used according to one aspect. Management console 118 may be a computer system similar to computing system 102A, described above in detail. Management console 118 executes a management application 117 that may be used to configure storage space as logical structures (for example, as LUNs) that are presented to computing systems 102A-102N for storing information or as cache LUNs at local storage for caching information stored at SAN LUNs. Permissions associated with a LUN may also be configured using management application 117. The permissions indicate which entities may be allowed to access a LUN to read and/or write information. Management application 117 may store LUN attributes and permissions in a configuration data structure 117A at a storage location. Management application 117 may also be used to configure a cluster having a plurality of ISAs. Details regarding how a cluster is created are provided below.

In one aspect, ISA 114A is provided that can provide transparent data caching at SSDs while efficiently synchronizing the SSD data with SAN-based storage devices. The ISA enables management of data stored at the SSDs. The ISA also enables the SSDs to be shared as SAN storage allowing other servers 102B-102N to access data residing at SSDs in server 102A. ISA 114A may configure a LUN from the local storage 108 and present the LUN to servers 102A-102N, allowing the local storage 108 to be shared by other servers 102B-102N.

In another aspect, ISA 114A provides traditional SAN connectivity to computing systems 102A and to the SSDs at each computing system. The SSDs may be managed as a storage pool that may be configured to operate as a cache pool to cache read/write data for SAN LUNs presented to the computing systems. SAN LUNs when configured may be tagged with an attribute that allows caching at the local SSDs for read and/or write caching.

Figure 1B:
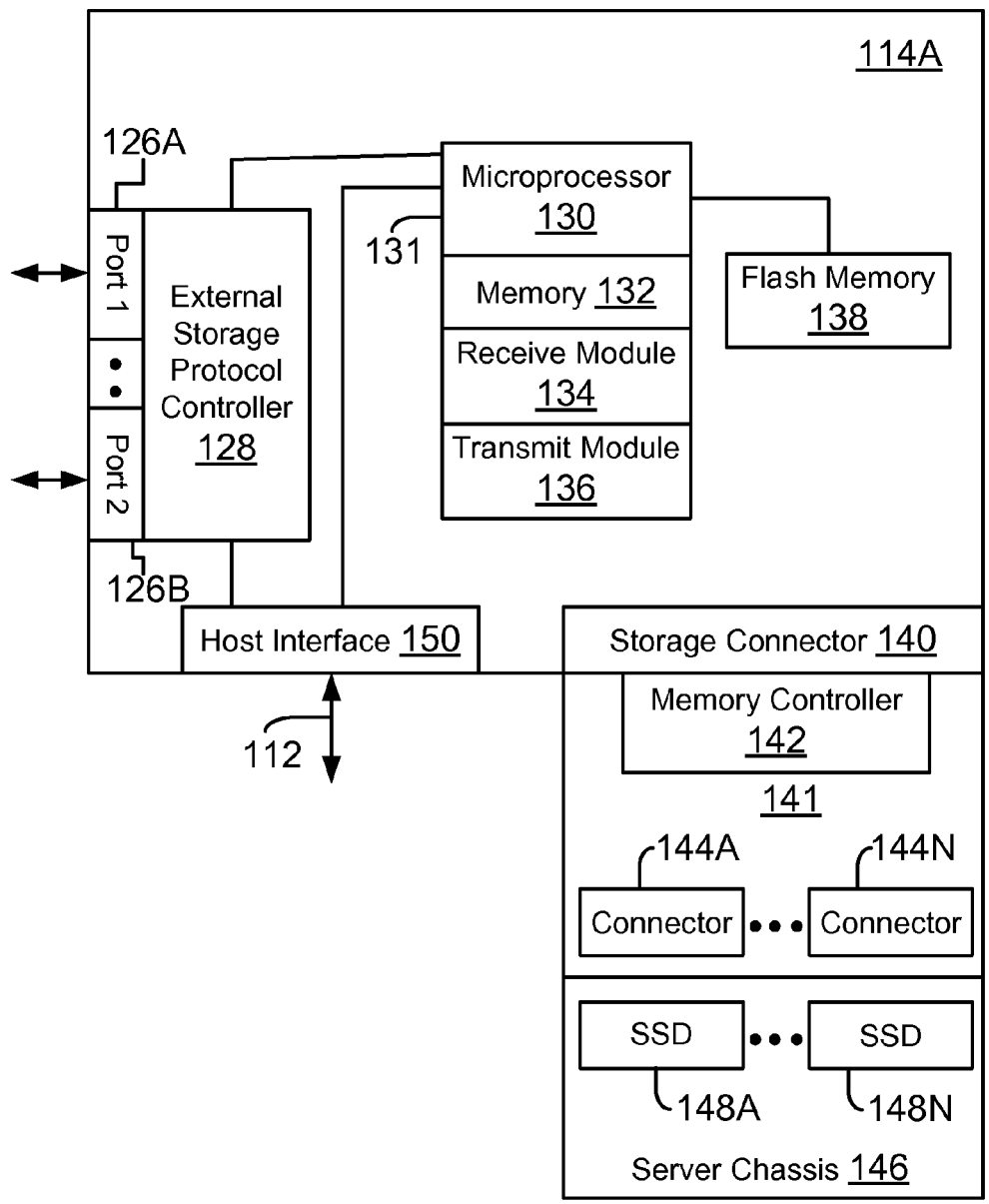
FIG. 1B shows an example of functional block diagram of an intelligent storage adapter (ISA)

FIG. 1B shows an example of ISA 114A that includes a storage protocol controller 128 (shown as "external storage protocol controller") with ports 126A and 126B. The storage protocol controller may be a Fibre Channel controller (or application specific integrated circuit (ASIC)). Ports 126A/126B include logic and circuitry for sending and receiving Fibre Channel frames. Fibre Channel is simply shown as an example and the various aspects disclosed herein are not limited to any particular storage/network protocol. Thus ports 126A-126B are not limited to just Fibre Channel ports. Furthermore, although only two ports 126A and 126B are shown as an example, the adaptive aspects disclosed herein are not limited to any particular number of ports.

Storage protocol controller 128 may operate as a host bus adapter for managing I/O requests for SAN-based storage. Storage protocol controller 128 is configured to process I/O requests for reading data from SAN-based storage (124A-124N) and writing data to SAN-based storage. Thus storage protocol controller 128 is used to take advantage of existing SAN infrastructure, while providing access to SSDs for computing systems 102A-102N.

In one aspect, storage protocol controller 128 includes a processor (not shown) for executing the Fibre Channel stack having layers FC0-FC4. FC0 is defined by the Fibre Channel specification as the physical layer, which includes cables (fiber optics, twisted-pair), connectors, and others. The FC1 layer is defined as the data link layer. This layer implements the 8B/10B encoding and decoding of signals. The FC2 layer is defined as the network layer. This layer defines the main Fibre Channel framing, addressing, and control protocols. The FC3 layer is an auxiliary layer that provides common services like encryption or RAID related. The FC4 layer is the protocol mapping layer where other protocols, such as SCSI, are encapsulated into an information unit for delivery to FC2 and transmission across a Fibre Channel network. This layer provides flexibility to Fibre Channel as a networking technology compatible with other technologies.

ISA 114A also includes a host interface 150 that interfaces with processor 104 via link 112. The structure of host interface 150 depends on the type of connection/interconnect used to communicate with processor 104. For example, if a PCI-Express link is used to communicate with processor 104, then host interface 150 includes logic and circuitry for receiving and sending PCI-Express packets/information.

ISA 114A includes a system-on-chip (SOC) 131 that includes a processor 130 having access to an adapter memory (may also be referred to as local memory) 132. Processor 130 may be one or more programmable general-purpose or special-purpose microprocessors, digital signal processors (DSPs), programmable controllers, application specific integrated circuits (ASICs), reduced instruction set computer (RISC), programmable logic devices (PLDs), or the like, or a combination of such hardware devices. Memory 132 may be used to store firmware instructions and various data structures for ISA 114A for controlling overall ISA 114A operations. Memory 132 may also store instructions for implementing the various aspects described herein.

SOC 131 may also include a receive module 134 and a transmit module 136. The receive module 134 may be used to store packets that are received via ports 126A/126B, while transmit module 136 may be used to store information that is transmitted via ports 126A/126B or to local SSDs that are described below. Receive module 134 and/or transmit module 136 may be separate modules and may include more than one component for processing received information or information that is transmitted.

ISA 114A may also include a non-volatile memory 138 (shown as flash memory) for storing parameters/instructions that may be used by micro-processor 130 for executing the instructions described below in detail. ISA 114A also includes a storage connector 140 that interfaces with another card 141 (may also be referred to as a daughter card 141), according to one aspect. In one aspect, the storage connector may be a PCI-Express connector, PCI connector, or any other connector type based on the interconnect used by SOC 131 to interface with the SSDs. The daughter card 141 includes a memory controller 142 that interfaces with a plurality of connectors' 144A-144N. The pluralities of connectors' 144A-144N are used to plug in SSDs 148A-148N (similar to storage 108). In this aspect, SSDs 148A-148N are included within a server chassis 146. In one aspect, connectors' 144A-144N may be SATA connectors for receiving SSDs 148A-148N. In another aspect, connectors' 144A-144N may be, for example, SAS connectors.

ISA 114A has SAN connectivity because of ports 126A-126B, similar to a host bus adapter, as mentioned above. The storage protocol controller 128 allows SAN storage-based processing. Unlike conventional HBAs, ISA 114A also includes a storage connector 140 that provides local storage solutions via SSDs 148A-148N.

Another aspect of ISA 114A is configured such that a daughter card has the SSDs 148A-148N on the card itself, rather than on the server chassis 146. Another aspect of ISA 114A is configured such that the memory controller 142 is on the same card as the other components of ISA 114A. The SSDs 148A-148N are also on the same card connected via one or more storage connectors.

FIG. 1C shows a system 100A where each ISA 114A-114C in servers 102A-102C is coupled to a fabric switch 160, according to one aspect. Fabric switch 160 that is a part of SAN 116 (shown in FIG. 1A) includes a plurality of ports 160A-160E. Ports 160A-160C are coupled to ISA 114A-114C ports, respectively, while port 160D is coupled to controller 122 of the mass storage system 120. Management console 118 may be coupled to port 160E for configuring various components of system 100A.

Management console 118 may be used to configure LUNs 156A-156C that are presented to application 105A executed by server 102A, application 105B executed by server 102B, and application 105C executed by server 102C for storing information. The LUNs may be based on storage located at SAN-based storage 120 or at a local SSD 148A-148N. In one aspect, one or more SAN LUNs are associated with an independent data LUN. The LUNs 156A-156C may also be configured to operate as local LUNs. In this configuration, a LUN may be used as a "boot" LUN. The LUN may be used by the host computing system to which it is presented. One or more ISAs may present the boot LUN to any of the servers that are served by a cluster of ISAs.

The LUNs 156A-156C may also be accessible by one or more servers via SAN 116. In this example, a DAS (direct attached storage)-based SSD becomes accessible as SAN storage, while the DAS-based storage is still managed by an application 105A (for example, a database application).

In one aspect, ISAs 114A-114C operate within a cluster. The cluster is configured using management application 117. The cluster is identified by a unique identifier. Within the cluster, a specific ISA may operate as a LUN owner or a "cache owner." The cache owner adapter interfaces with the SAN LUN for executing read and write operations. As an example, adapter 114A may be the cache owner for LUN 156A that is presented to application 105A. In this configuration, ISA 114B becomes the client ISA or the client adapter.

A caching system can operate in different modes, including "write-through" caching and "write-back" caching. "Write-through" caching means that data may be placed in cache for ease of retrieval, but at the same or nearly the same time, the data is also written to its primary storage location (often SAN storage, as discussed herein). "Write-back" caching means that data may be written to cache, but that the system will wait to write the data to its primary storage location—such as when network resources are more readily available. Although operating "write-back" caching can be more efficient, there is also risk of data loss if the cache is lost before the primary storage is updated. In one solution, an operator may select to operate a system in a "write-back" mode with mirroring to reduce the risk of data loss. An example of a system offering mirroring is described in FIG. 1D.

Figure 1D:
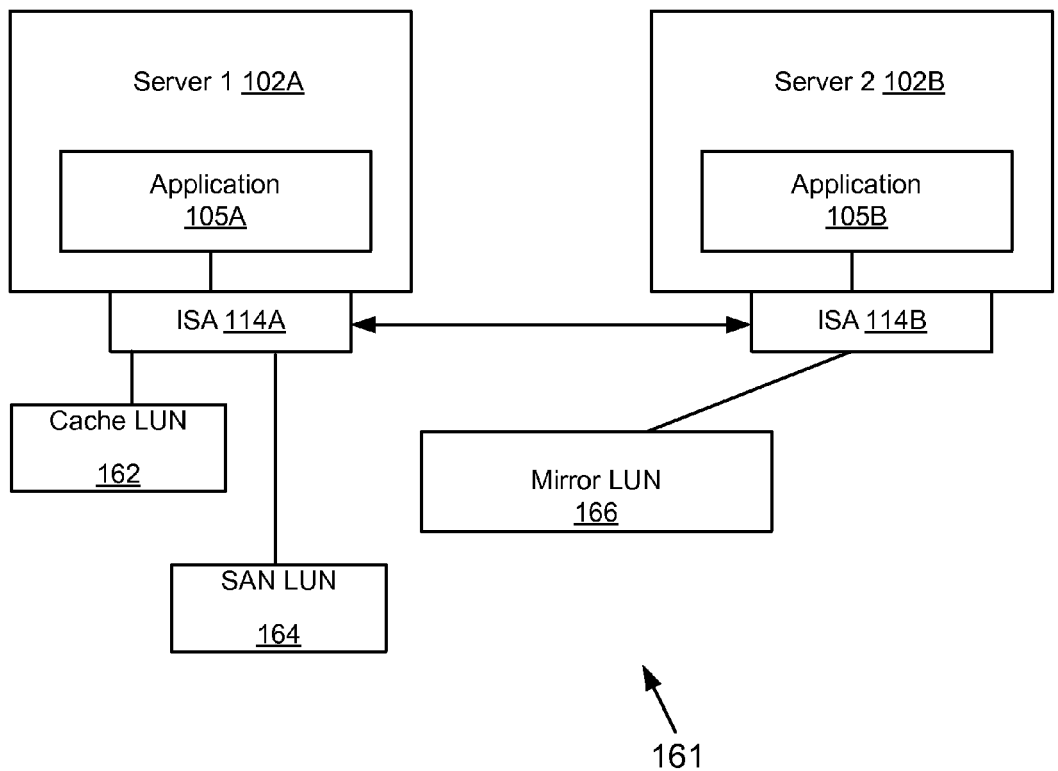
FIG. 1D shows an example of a functional block diagram of a configuration for cache mirroring in a system using ISAs.

FIG. 1D shows an example of a cluster 161 that includes ISAs 114A-114B. A cluster may be automatically created when more than one ISA is deployed and discovered. An ISA may also be added automatically when an ISA is initialized for communication within a cluster.

Cluster 161 is configured to provide data redundancy in a caching system. In this aspect, ISA 114A operates as a cache owner and ISA 114B operates as a cache client adapter for a Cache LUN 162. However, it is important to note that either or both of ISA 114A and 114B can act as cache owners and cache client adapters in various contexts. For example, ISA 114B may be a cache owner with respect to application 105B. In the illustrated configuration, an application 105A may be presented with a LUN ID for storage at SAN LUN 164. ISA 114A receives I/O requests from application 105A for the SAN LUN 164 and caches some or all of the data directed to SAN LUN 164 in cache LUN 162.

ISA 114B uses a mirror LUN 166 to mirror data that is stored at cache LUN 162. This provides redundancy for the cache LUN 162. In this example, ISA 114A and ISA 114B act in concert to provide quick access to data stored in cache LUN 162, while also providing data redundancy and security to SAN LUN 164. In this configuration, ISA 114A manages cache LUN 162, typically stored in a local SSD, for example, SSD 148A (see FIG. 1B). Additionally, ISA 114B manages the mirror LUN 166, typically stored in its own associated SSD.

When application 105A issues an I/O command/receives, ISA 114A receives the command and carries out the operation at cache LUN 162. It also generally forwards the I/O command to ISA 114B, which carries out the operation on mirror LUN 166. When both the cache LUN operation and the mirror LUN operation are acknowledged, ISA 114A can acknowledge completion of the operation to application 105A (whether or not the operation has been forwarded to SAN LUN 202 (on storage system 120). Aspects of this communication between ISA 114A and 114B are described in more detail herein with respect to the remaining figures.

Figure 1E:
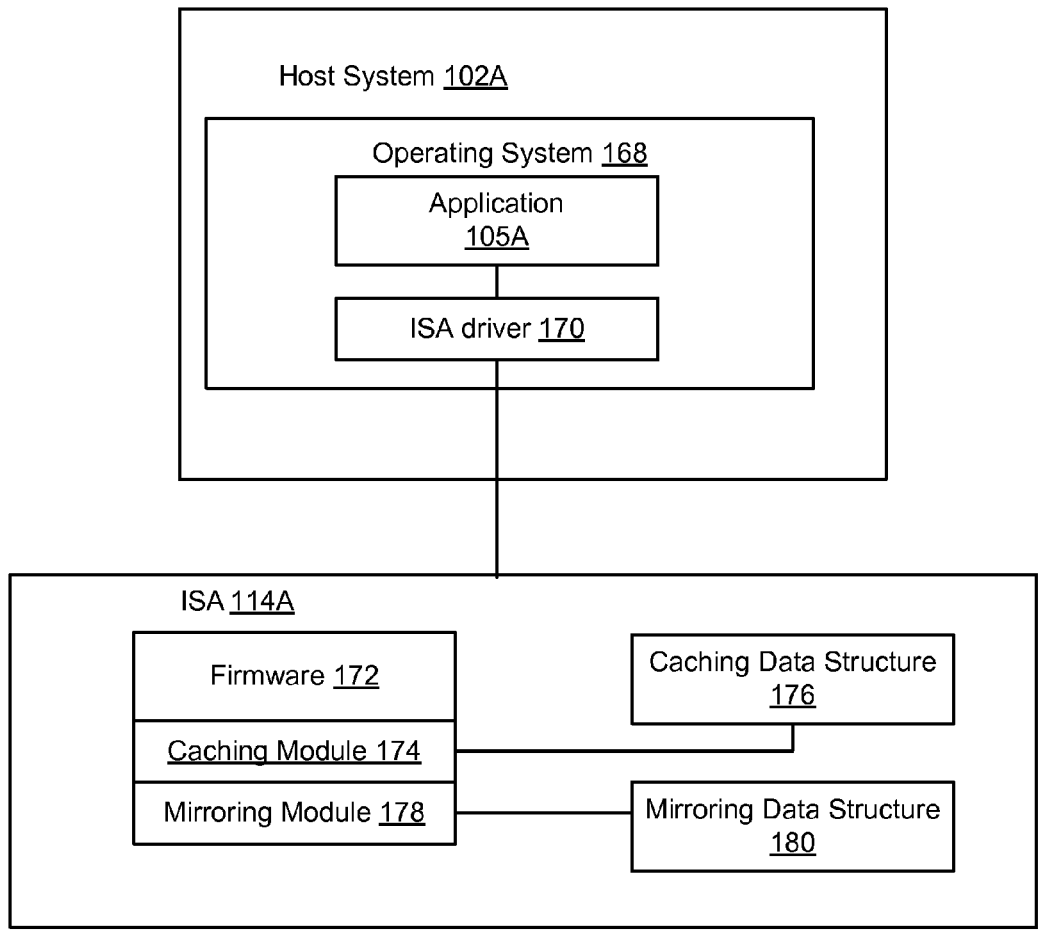
FIG. 1E shows an example of an architecture used by the system of FIG. 1D.

Moving to FIG. 1E, aspects of software and firmware modules operating on host system 102A and ISA 114A are disclosed. Although described in terms of software and/or firmware, it is important to note that these modules may be implemented in any of a variety of other ways, including hardware, as described above and understood by those of skill in the art. Host system 102A runs an operating system 168, such as, for example and without limitation, a flavor of Linux, UNIX, iOS, Microsoft® Windows, Android OS, or the like. The operating system manages various applications, such as application 105A described above. Additionally, the operating system may manage an ISA driver 170, which is used for communications between the host system 102A and the ISA 114A.

ISA 114A may execute firmware 172 for controlling the overall ISA 114A operations. Firmware 172 may include or interface with a caching module 174 for handling caching operations, such as with respect to the cache LUN 162 (FIG. 1D). The caching module 174 may be stored at local memory, such as 132 (FIG. 1B).

The firmware 172 further includes or interfaces with a mirroring module 178 for handling tasks associated with mirroring the cache LUN 162 at the mirror LUN 166 and communicating with the cache mirror client ISA (for example, 114B).

In one aspect, caching module 174 maintains the definition for creating and handling a caching data structure 176, and the mirroring module 178 maintains the definition for creating and handling a mirroring data structure 180. Examples of these data structures and the operation of the caching and mirroring modules are described in more detail in reference to FIG. 1F.

Figure 1F:
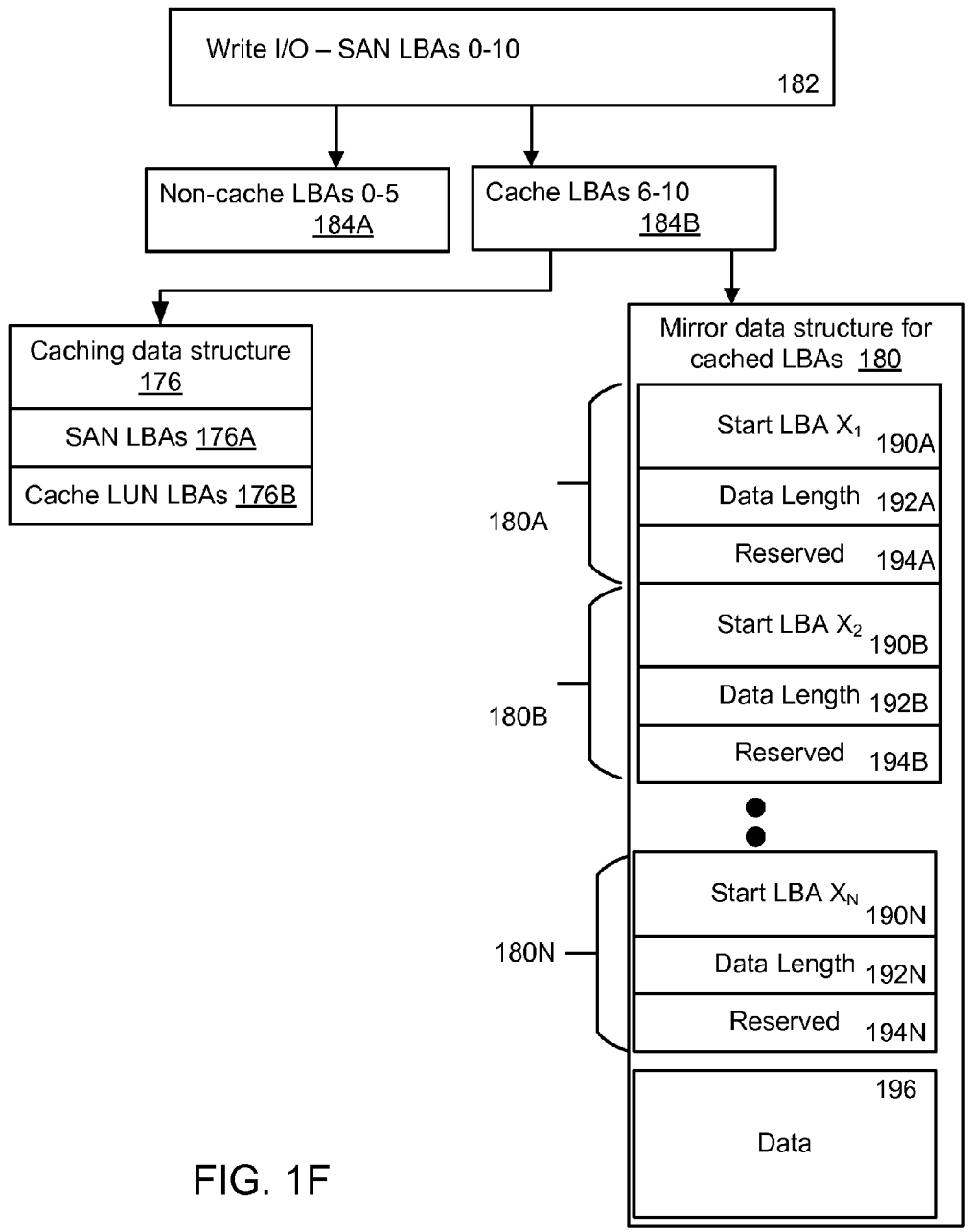
FIG. 1F shows an example of using various data structures in a caching system according to one aspect.

Application 105A sends an I/O command to write data, for example, to SAN LUN 164. The command is received by ISA 114A. The I/O command may indicate, for example, that ISA 114B should write data at SAN LBAs 0-10 (FIG. 1F, Block 182). Caching module 174 splits the I/O command to write data into non-cache LBAs and cache LBAs (Block 184). For example, the ISA 114A may determine that LBAs 0-5 (184A) are not often read or written and thus not worth caching at cache LUN 162 and are only written to SAN LUN 164. Furthermore, cache LUN 162 may not be large enough to fully cache SAN LUN 164. On the other hand, cache LBAs 6-10 (184B) may be used to store data that is read or written often by application 105A.

Cache LBAs 6-10 are processed by the caching data module 174 and mirrored by the mirror data module 178 to create caching data structure 176 and mirror data structure 180. In an aspect, caching data structure 176 includes SAN LUN LBAs 176A to identify where the LBAs are stored at the SAN LUN or where the application 105A believes them to be stored. The location of those LBAs in the cache LUN (176B) is then also put in the caching data structure. This allows the ISA 114A to translate an application's address instructions for the SAN LUN into the caching data locations of the cache LUN.

The mirror data structure 180, in the illustrated aspect, includes a descriptor list 180A, 180B . . . 180N. In an aspect, each descriptor corresponds to a cache component (184B) split by the ISA 114A. In one aspect, each descriptor includes a Start LBA (190), a data length (192), and a reserved section (194). The Start LBA 190A-190N corresponds to the cache LBAs 184B. This descriptor list, together with the data to be written 196 (which may include one or multiple blocks), makes up the mirror data structure 180.

In another aspect, the mirror data structure 180 includes one or more descriptors 180A, B, etc. with each having an associated data block. The mirror data structure 180 may be encapsulated in or may comprise a CDB (for example, a SCSI CDB), such as a 64 byte CDB. ISA 114A inserts an operation code (opcode) in the CDB to indicate that the CDB is for a mirror operation and sends the CDB to ISA 114B. ISA 114B receives the CDB, examines the opcode and determines that the CDB is for a mirror operation. ISA 114B does not have to split the I/O because ISA 114A already did that by creating the descriptor list. In this manner, the mirror write operation can be accomplished with only one I/O command sent to the mirror cache ISA 114B.

Figure 2:
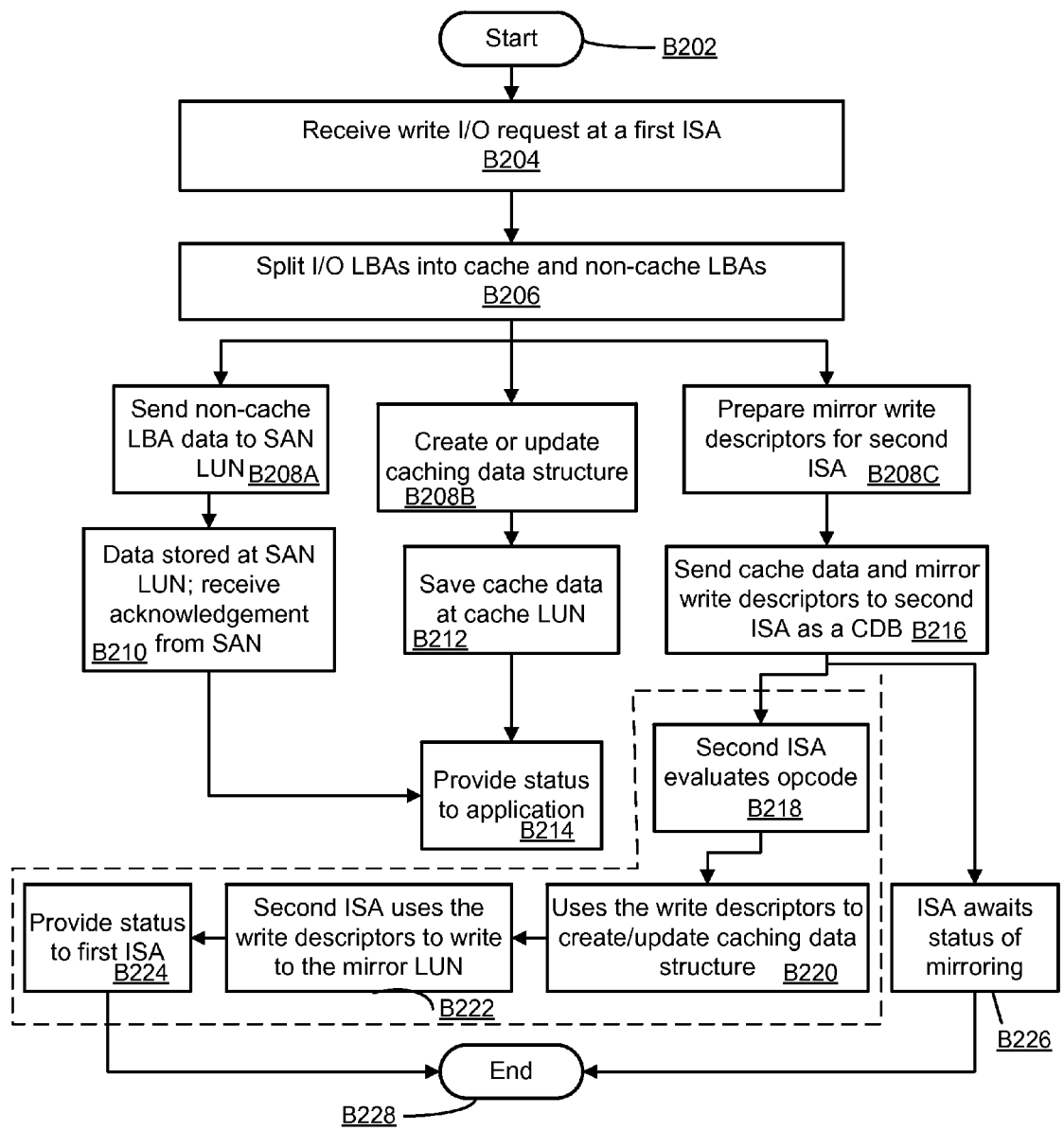
FIG. 2 shows a process flow according to one aspect of the present disclosure.

An aspect of a method for efficient mirroring as described herein, is set forth in more detail in the process flow of FIG. 2. In the aspect, the process starts at block B202 where a first ISA (114A in FIG. 1D) is configured and operational to cache data at a cache LUN (for example, 162) for an application (for example, 105A) for storing data at a SAN LUN (for example, 164). Additionally, a second ISA (114B) is configured and operational to provide mirroring at a mirror LUN (for example, 166).

In block B204, the first ISA receives a write I/O request from the application. Using caching module (174 in FIG. 1E), the first ISA splits the I/O request into cache and non-cache LBA segments 9 for example, 184A and 184B) at block B206. The non-cache LBAs are sent to the SAN LUN for storage at block 208A. In various aspects, the data sent to the SAN LUN may include only the "non-cache" LBAs or may include some or all of the cache LBA segments as well. The selection of which LBAs to forward to the SAN LUN may be based on specific rules, system resource availability metrics, combinations of the same, and/or the like in various aspects.

At block B210, the first ISA receives acknowledgement from a storage controller indicating that data has been stored.

At block B208B, the first ISA (utilizing caching module 174) will update the caching data structure (176) according to the cache LBAs, and save the cache data in the cache LUN (162) at block B212.

At block B214, the first ISA can provide an I/O command status to the associated application, once it receives the status from the SAN LUN and the cache LUN. It should be noted that this step may not need input from the SAN LUN when, for example, the entire I/O is made up of cache LBAs. In such a case, the status of saving the data to the cache LUN may be sufficient.

At block B208C, the first ISA (using mirroring module 178, in an aspect), also prepares the mirror write descriptors for the mirroring data structure 180. At block B216, the mirror write descriptors and the data to be mirrored (all in mirroring data structure 180 or in associated data structures in various aspects) are sent to the second ISA. In an aspect, this is sent as a CDB. The first ISA then awaits the status of the mirroring operation from the second ISA (block B226).

Upon receiving the mirroring data at the second ISA, the second ISA processes the request as shown within the dashed line block of FIG. 2. More specifically, in an aspect, the second ISA evaluates an opcode of the CDB to determine that it is for performing a mirroring operation (block B218). Other aspects of a CDB may also be used to recognize a mirroring operation, such as, for example, a CDB version and/or a CDB sub-opcode. At block B220, the second ISA uses the write descriptors (180A, B . . . ) to create and/or update its own cache data structure and, at block B222, writes the data to the mirror LUN. In an aspect, the second ISA avoids having to break up the original I/O requests, and, indeed, the only data it receives relates to data that is cached. It therefore operates more efficiently than having to process the original I/O requests. At block B224, the second ISA returns a status of the mirroring operation to the first ISA.

The process described in FIG. 2 is illustrative only, and it should be noted that the blocks shown may be combined, split apart, and/or reordered in various aspects, while still adhering to the spirit of the disclosure herein. It should also be noted that the mirroring tasks may be accomplished by one or more secondary ISAs, utilizing the same or different mirror LUNs depending on various factors, such as, for example, ISA availability, ISA status, data importance or priority, and the like.

Although the present disclosure has been described with reference to specific aspects, these aspects are illustrative only and not limiting. For example, although the description above has been described with respect to an ISA, any other device may be configured to perform the foregoing function. Thus the term adapter and device are interchangeable. Many other applications and aspects of the present disclosure will be apparent in light of this disclosure and the following claims. References throughout this specification to "one aspect" or "an aspect" means that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

What is claimed is:

1. A machine-implemented method, comprising:
   receiving an input/output (I/O) request from an application for writing data;
   splitting the I/O request by a caching device into cache logical block addresses (LBAs) and non-cache LBAs;
   storing data associated with the cache LBAs using a cache logical unit number (LUN);
   preparing a mirroring data structure comprising one or more mirror write descriptors based on the cache LBAs, wherein each mirror write descriptor includes a data location and a data length; and
   sending the mirroring data structure to a mirroring device to store a back-up of the cache LUN.

2. The machine-implemented method of claim 1, wherein the caching device comprises a first Intelligent Storage Adapter (ISA) and the mirroring device comprises a second ISA.

3. The machine-implemented method of claim 1, further comprising:
   sending the non-cache LBAs to a storage area network (SAN) LUN; and
   sending a status response of the I/O request back to the application.

4. The machine-implemented method of claim 3, wherein the status response is based on storing the cache LBAs using the cache LUN.

5. The machine-implemented method of claim 3, further comprising: receiving a SAN LUN status response, wherein the status response of the I/O request is based on the SAN LUN status response and storing the cache LBAs using the cache LUN.

6. The machine-implemented method of claim 1, wherein sending the mirroring data structure and the cache LBAs to a mirroring device is accomplished through one I/O request to the mirroring device.

7. The machine-implemented method of claim 6, wherein the one I/O request is included in a command descriptor block (CDB).

8. A non-transitory, machine readable storage medium storing executable instructions, which when executed by a machine, causes the machine to perform a method, the method comprising:
   receiving an input/output (I/O) request from an application for writing data;
   splitting the I/O request into cache LBAs and non-cache LBAs;
   storing data associated with the cache LBAs using a cache LUN;
   preparing a mirroring data structure comprising one or more mirror write descriptors based on the cache LBAs, wherein each mirror write descriptor includes a data location and a data length; and
   sending the mirroring data structure to a mirroring device to store a back-up of the cache LUN.

9. The storage medium of claim 8 wherein the caching device comprises a first ISA and the mirroring device comprises a second ISA.

10. The storage medium of claim 8, wherein the method further comprises:
    sending the non-cache LBAs to a SAN LUN; and
    sending a status response of the I/O request back to the application.

11. The storage medium of claim 10, wherein the status response is based on storing the cache LBAs using the cache LUN.

12. The storage medium of claim 10, wherein the method further comprises: receiving a SAN LUN status response, wherein the status response of the I/O request is based on the SAN LUN status response and storing the cache LBAs using the cache LUN.

13. The storage medium of claim 8, wherein sending the mirroring data structure and the cache LBAs to a mirroring device is accomplished through one I/O request to the mirroring device.

14. The storage medium of claim 13 wherein the one I/O request is included in a CDB.

15. A system comprising:
    a processor executing instructions out of a memory for:
       receiving an input/output (I/O) request from an application for writing data;
       splitting the I/O request by a caching device into cache LBAs and non-cache LBAs;
       storing data associated with the cache LBAs using a cache LUN;

preparing a mirroring data structure comprising one or more mirror write descriptors based on the cache LBAs, wherein each mirror write descriptor includes a data location and a data length; and sending the mirroring data structure to a mirroring device to store a back-up of the cache LUN.

16. The system of claim 15, wherein the caching device comprises a first ISA and the mirroring device comprises a second ISA.

17. The system of claim 15, wherein the processor further executing instructions for:

sending the non-cache LBAs to a SAN LUN; and sending a status response of the I/O request back to the application.

18. The system of claim 17, wherein the status response is based on storing the cache LBAs using the cache LUN.

19. The system of claim 17, the processor further executing instructions for: receiving a SAN LUN status response, wherein the status response of the I/O request is based on the SAN LUN status response and storing the cache LBAs using the cache LUN.

20. The system of claim 15 wherein sending the mirroring data structure and the cache LBAs to a mirroring device is accomplished through one I/O request to the mirroring device.

21. The system of claim 20 wherein the one I/O request is included in a CDB.

* * * * *